United States Patent [19]
Chee et al.

[11] Patent Number: 6,143,828
[45] Date of Patent: Nov. 7, 2000

[54] OLEFIN-BASED CROSSLINKED THERMOPLASTIC ELASTOMERS AND A PROCESS OF PREPARATION THEREOF

[75] Inventors: Ho Jin Chee, Seoul; Min Jae Hwang, Taejeon; Byung Yun Lim, Taejeon; Chang Hyoo Choi, Taejeon, all of Rep. of Korea

[73] Assignee: Honam Petrochemical Corporation, Seoul, Rep. of Korea

[21] Appl. No.: 09/147,690

[22] PCT Filed: Jun. 14, 1997

[86] PCT No.: PCT/KR97/00114

§ 371 Date: Feb. 16, 1999

§ 102(e) Date: Feb. 16, 1999

[87] PCT Pub. No.: WO98/58020

PCT Pub. Date: Dec. 23, 1998

[51] Int. Cl.[7] .............................. C08F 8/00; C08L 25/00; C08L 25/02
[52] U.S. Cl. ..................... 525/192; 525/194; 525/195; 525/240; 525/241
[58] Field of Search ...................... 525/192, 194, 525/195, 240, 241

[56] References Cited

U.S. PATENT DOCUMENTS

| | | |
|---|---|---|
| 3,758,643 | 9/1973 | Fischer . |
| 4,311,628 | 1/1982 | Abdou-Sabet et al. . |
| 4,785,045 | 11/1988 | Yonekura et al. ....................... 524/528 |
| 5,272,236 | 12/1993 | Lai et al. ............................. 526/348.5 |
| 5,278,272 | 1/1994 | Lai et al. ............................. 526/348.5 |
| 5,389,715 | 2/1995 | Davis et al. ............................ 524/505 |
| 5,717,020 | 2/1998 | Kopytko ................................. 524/425 |

FOREIGN PATENT DOCUMENTS

| | | |
|---|---|---|
| 213 285 | 3/1987 | European Pat. Off. . |
| 256 724 | 2/1988 | European Pat. Off. . |
| 519 691 | 12/1992 | European Pat. Off. . |

*Primary Examiner*—Nathan M. Nutter
*Attorney, Agent, or Firm*—Foley & Lardner

[57] ABSTRACT

There is provided olefin-based cross-linked thermoplastic elastomers and a preparation method thereof. The TPE comprises a thermoplastic polyolefin resin; an ethylene-propylene-dien rubber; an ethylene-octene copolymer; and a phenolic cross-linking agent. The TPE shows good tensile strength, tension set and compression set.

9 Claims, No Drawings

OLEFIN-BASED CROSSLINKED THERMOPLASTIC ELASTOMERS AND A PROCESS OF PREPARATION THEREOF

This application claims the benefit under 35 USC 371 of prior PCT International Application No. PCT/KR97/00114 which has an International filing date of Jun. 14, 1997.

BACKGROUND OF THE INVENTION

1. Field of the Invention

The present invention relates generally to olefin-based crosslinked thermoplastic elastomers and a process of preparation thereof. More particularly, the present invention relates to olefin-based crosslinked thermoplastic elastomers made from an olefin-based resin, an ethylene-propylene-diene rubber and an ethylene-octene copolymer and having improved properties, and to a process of preparation thereof.

2. Description of the Related Arts

Olefin-based thermoplastic resins modified with elastomers such as rubbers to impart elasticity, or elastomers modified with thermoplastic resins to render having processability are extensively developed due to their good physical properties and good processability. These types of materials are designated as thermoplastic elastomers because they exhibit thermoplasticity as well as elasticity. They are advantageous in that they can be directly molded by using extrusion, injection and press molding process without crosslinking-aging step, which is required for common rubber to be molded. For this reason, they replace a wide range of rubbers needing processability and thermoplastic resins needing elasticity. In particular, olefin-based crosslinked thermoplastic elastomers, unlike styrene-based copolymers or urethane-based thermoplastic elastomers, show a wide range of physical and processing characteristics depending on the degree of crosslinking of elastomers incorporated therein. This renders them applicable to a wide range of uses and have highest market share. Various researches have been made to develop new crosslinking systems which can be advantageously used for olefin-based crosslinked elastomers having a same composition. in general, crosslinked thermoplastic elastomers are classified into three groups: no cured thermoplastic elastomer (hereinafter referred to as TPO) wherein rubbers are incorporated without a crosslinking agent; partially crosslinked thermoplastic elastomers (hereinafter referred to as TPR) wherein rubbers are partially crosslinked into the thermoplastic resin; and completely crosslinked thermoplastic elastomers (hereinafter referred to as TPV) wherein rubbers are completely crosslinked into the thermoplastic resin.

The degree of crosslinking affects the size and fine dispersion of rubber particles in crosslinked thermoplastic elastomers, consequently affects elastic characteristics such as tensile strength, permanent tension set, permanent compression set and et al. In more detail, in cases of TPO having no crosslinking of rubber and TPR, there are limitations in obtaining the finely dispersed rubber particles by shear stress. Especially, this becomes more severe as the amount of rubber increases. For this reason, materials requiring elasticity and thermoplasticity should have been made by the dynamic vulcanization in which cured rubbers are pulverized by shear stress during the mixing.

Many developments have been made for crosslinked thermoplastic elastomers. For example, commercial olefin-based crosslinked TPE may include TPR™ by UniRoyal, USA (U.S. Pat. No. 3,758,643), which is the first commercial product, and Santoprene™ by Monsanto, USA (U.S. Pat. No. 4,311,628). As crosslinked thermoplastic elastomers using peroxides as a crosslinking agent, Milastomer™ by Mitsui Petrochemical, Japan (U.S. Pat. No. 4,785,045).

TPR™ and Milastomer™ are crosslinked hermoplastic elastomers in which a combination of polyolefin resin and ethylene-propylene rubber (hereinafter referred to as EPR), or of ethylene-propylene-diene rubber (hereinafter referred to as EPDM) is partially crosslinked by using peroxide crosslinking agents. When peroxide crosslinking agents are used for the crosslinking of rubbers, crosslinking rate and reactivity are good. On the other hand, peroxide crosslinking agents can not be used in a sufficient amount, since polyolefin is decomposed by the crosslinking agents. Therefore, there is a limitation in improving the elastic characteristics such as permanent compression set or permanent tension set. Moreover, because the decomposition of polyolefin resin is induced during the crosslinking of rubbers goes on, mechanical properties and stability of system are deteriorated.

Santoprene™ is a crosslinked thermoplastic elastomer by completely crosslinking a combination of polyolefin and EPDM using a phenolic crosslinking agent. Since a tin-based crosslinking accelerator is used to increase the rate of crosslinking, the final product has odor and brownish color, and is apt to absorb moisture. Although the degree of crosslinking can be increased since only EPDM rubber is used, the remaining crosslinking agent may cause a excessive crosslinking during molding process, consequently the mechanical properties such as tensile strength and elongation, and permanent compression set are decreased.

Accordingly, olefin-based crosslinked thermoplastic elastomers free from the problems of the conventional TPE has been needed.

SUMMARY OF THE INVENTION

Thus, the present invention provides olefin-based crosslinked thermoplastic elastomers having good elasticity.

The present invention also provides a new crosslinking agent system.

The present invention still provides olefin-based crosslinked thermoplastic elastomers having good tensile strength and good elastic properties such as permanent compression set and permanent tension set.

Further, the present invention provides a method for preparing olefin-based crosslinked thermoplastic elastomers.

DETAILED DESCRIPTION OF THE INVENTION

The present invention is based on the findings that partially crosslinked thermoplastic elastomers can show better tensile strength and good elastic properties such as permanent compression set and permanent tension set than those of completely crosslinked thermoplastic elastomers, when the smaller size and finer dispersion of the rubber particles in the system is obtained from the reduction of the difference of interfacial tension and the increase of interfacial adhesion between the components in a multi-component system at the early stage of dynamic vulcanization process.

Thus, a mixture of a conventional polypropylene thermoplastic resin (First component) and ethylene-propylene-diene rubber (Second component) is combined with ethylene-octene copolymer (Third component) to improve interfacial adhesions, which consequently renders a production of olefin-based crosslinked thermoplastic elastomers having good properties. Ethylene of the third component is the same as ethylene of the second component.

According to the present invention, the partially crosslinked third component can be obtained by using a proper crosslinking agent system. By using the crosslinking agent system according to the present invention, the degree of crosslinking and consequently the density of crosslinking can be improved. Thus, it can be crosslinked thermoplastic elastomers showing improved tensile strength and good elastic properties such as permanent compression set and permanent tension set.

The olefin-based crosslinked thermoplastic elastomer (hereinafter referred to as 'TPE') comprises an olefin-based thermoplastic resin and an olefin-based rubber, and further comprises ethylene-octene copolymer wherein ethylene units are copolymerized with octene in the presence of a metallocene catalyst.

The TPE according to the present invention comprises, based on 100 parts by weight of following (A)+(B)+(C), (A) 17–82 parts by weight of a thermoplastic polyolefin resin;
(B) 14.2–76 parts by weight of an ethylene-propylene-diene rubber satisfying the following conditions;
  (a) propylene content: 10–50 wt %
  (b) Mooney viscosity at 100° C.: 20–100 $ML_{1+4}$
(C) 3.8–76 parts by weight of an ethylene-octene copolymer in which ethylene units are copolymerized with octene in the presence of metallocene catalyst and which satisfies the following conditions;
  (a) octene content: 9.5–30 wt %
  (b) melt index: 0.3–30 dg/min.; and
(D) 1–15 parts by weight of a phenolic crosslinking agent.

Each component of the elastomer will be described in detail below.

As a thermoplastic polyolefin resin (A), homopolypropylene or, block or random copolymers of ethylene and propylene may be used. When the amount of the resin (A) is less than 17 parts by weight with respect to 100 parts by weight of the total amount of (A), (B) and (C), the mechanical strength and processability of the resulting TPE are deteriorated. On the other hand, when the amount of the resin (A) exceeds 82 parts by weight, impact strength and elasticity of the resulting elastomer are deteriorated. Therefore, according to the present invention, the polyolefin resin (A) is used in an amount of 17–82 parts by weight, preferably 20–70 parts by weight based on 100 parts by weight of (A)+(B)+(C).

Ethylene-propylene-diene rubber ('EPDM') (B) of the present invention has been incorporated into crosslinked thermoplastic elastomer as frequently as ethylene-propylene rubber, since EPDM (B) exhibits good compatibility with the resin (A), and better ozone-proof and weatherability than other rubbers such as natural, styrene-butadiene, chloroprene and nitrile-based rubbers. Further, EPDM is advantageous that it can be crosslinked by phenolic crosslinking agents, since it has unsaturated bonds between carbon atoms.

For the present invention, 14.2–76 parts by weight, preferably 30–60 parts by weight, based on 100 parts by weight of (A)+(B)+(C), of EPDM is used and EPDM has a propylene content of 10–50 wt % and Mooney viscosity at 100° C. of 20–100 $ML_{1+4}$. When the Mooney viscosity at 100° C. is less than 20 $ML_{1+4}$, mechanical strength of the resulting TPE is deteriorated and dispersive rearrangement by shear stress is not satisfactory. On the other hand, when the Mooney viscosity at 100° C. exceeds 100 $ML_{1+4}$, the processability of the TPE is deteriorated.

Ethylene-octene copolymer ('EOR') (C) is an ethylene-based rubber in which octene is copolymerized as a long branch chain, and is used to increase elasticity of the TPE due to the increased interfacial adhesion of the system. EOR (C) has an octene content of 9.5–30 wt %. Since EOR having the octene content more than 10 wt % cannot be obtained by using Ziegler-Natta catalyst, EOR prepared by using metallocene catalyst is used. The preparation of EOR having the octene content of 9.5–30 wt % using metallocene catalyst is described in, for example U.S. Pat. No. 5,272,236 and U.S. Pat. No. 5,278,272.

EOR (C) shows good compatibility with EPDM (B) due to ethylene component, and has a narrow molecular weight distribution and uniform physical properties. Further, EOR (C) exhibits greater heat-resistance and photo-resistance than other rubbers, due to the presence of octene unit. Thus, a long branch chain with the octene component imparts gloss and clearness to the TPE, and contributes good processability to the TPE. For the present invention, EOR (C) is used in the amount of 3.8–76 parts by weight, preferably 20–50 parts by weight based on 100 parts by weight of (A)+(B)+(C). When the amount of EOR (C) exceeds 76 parts by weight, the density of crosslinking is reduced and consequently elasticity of the TPE is decreased.

According to the present invention, a phenolic resin is used as a crosslinking agent. In particular, dimethylol phenolic resins may advantageously be used. The phenolic resin proceeds with crosslinking process by decomposing unsaturated carbon bonds in EPDM (B), and can be used to sufficient amount since it does not decompose polyolefin resin (A), unlike peroxide crosslinking agent. This enables the degree of crosslinking as wide as from 10% to 95%. For the present invention, phenolic resin (D) is used in the amount of 1–15 parts by weight, preferably 3–15 parts by weight based on 100 parts by weight of (A)+(B)+(C). When the amount of phenolic resin (D) exceeds 15 parts by weight, the remaining crosslinking agent (D) after the crosslinking process will proceed with further crosslinking during the subsequent molding process, eventually resulting in a deterioration of physical properties of the molded articles.

According to the present invention, a crosslinking accelerator may be used to increase the rate of crosslinking. The crosslinking accelerator, which may be used for the present invention, may include oxides of Mg, Pb or Zn, in single or combinations thereof. The crosslinking accelerator may be used in the amount of 1–7 parts by weight based on 100 parts by weight of (A)+(B)+(C).

The crosslinking agent system according to the invention, which is comprised of a phenolic resin (D) and a metal oxide, can induce a crosslinking of EOR so that it can effectively improve the degree of crosslinking compared when only phenolic resin (D) is used. Further, it can block an excessive crosslinking during the molding process to maintain the mechanical properties of the TPE stably.

The TPE may be further incorporated with additives which are commonly used in the resin composition to improve the physical properties of the TPE. The additives may include, but not limited thereto, inorganic additives such as silica, clay, talc, titanium oxide, zinc oxide or lead oxide, carbon black, flame retardants, thermostabilizers and the like.

The TPE according to the present invention may be prepared by subjecting the composition containing the components described above to dynamic vulcanization process at a temperature of 170–220° C., 30–120 rpm during the retention time of 5–20 minutes.

PREFERRED EMBODIMENTS OF THE INVENTION

The present invention will be described in more detail by way of the following Examples, which should not be considered to limit the scope of the present invention.

D-2240, permanent compression set was according to the method of D-395. These methods have been applied for the conventional crosslinked thermoplastic elastomers. Further, to measure the degree of crosslinking, test specimen was pulverized and then 30 g of the powder was placed in a boiling xylene for 12 hours. The degree of crosslinking was defined as weight of the remaining samples. The results are shown in Table 1.

EXAMPLES 2~12

By following the procedure of Example 1, crosslinked thermoplastic elastomers were prepared, except that the amount of crosslinking agent, and kind and amount of crosslinking accelerator are selected as shown in Table 1. The properties of the products were measured by the same criteria and methods in Example 1, and the results are shown in Table 1.

TABLE 1

| | | | | Examples | | | | | | | | | | | |
|---|---|---|---|---|---|---|---|---|---|---|---|---|---|---|---|
| Components | | | | 1 | 2 | 3 | 4 | 5 | 6 | 7 | 8 | 9 | 10 | 11 | 12 |
| EPDM(1) | | | | 50 | 50 | 50 | 50 | 50 | 50 | 50 | 50 | 50 | 50 | 50 | 50 |
| EOR(1) | | | | 10 | 10 | 10 | 10 | 10 | 10 | 10 | 10 | 10 | 10 | 10 | 10 |
| Polypropylene | | | | 40 | 40 | 40 | 40 | 40 | 40 | 40 | 40 | 40 | 40 | 40 | 40 |
| Crosslinking agent | | | | 1 | 1 | 1 | 3 | 3 | 3 | 5 | 5 | 5 | 5 | 7 | 7 |
| Crosslinking accelerator A | | | | 1 | — | — | — | 2 | 2 | — | 3 | 2 | 2 | 3 | — |
| Crosslinking accelerator B | | | | — | 1 | — | — | 1 | — | — | — | 1 | — | — | 2 |
| Crosslinking accelerator C | | | | — | — | 1 | — | — | 1 | — | — | — | 1 | — | 1 |
| Properties | ASTM | Units | Temp. | | | | | | | | | | | | |
| Hardness | D2240 | shore | 25° C. | 75A | 72A | 75A | 78A | 80A | 81A | 80A | 83A | 83A | 85A | 83A | 84A |
| Tensile strength | D412 | kgf/cm$^2$ | 25° C. | 67 | 63 | 69 | 71 | 75 | 77 | 85 | 90 | 90 | 93 | 91 | 94 |
| 100% Modulus | D412 | kgf/cm$^2$ | 25° C. | 61 | 59 | 60 | 63 | 66 | 68 | 72 | 76 | 78 | 78 | 78 | 79 |
| Elongation | D412 | % | 25° C. | 500 | 500 | 500 | 480 | 450 | 430 | 400 | 370 | 380 | 360 | 320 | 300 |
| Crosslinking degree | Xylene | wt % | Boil | 25 | 20 | 21 | 35 | 40 | 43 | 53 | 60 | 61 | 63 | 62 | 63 |

EXAMPLE 1

40 parts by weight of polypropylene(isotactic index: 98%, melt index: 10 dg/min), 50 parts by weight of EPDM(l) (propylene content: 43%, Mooney viscosity: 65 $ML_{1+4}$(100° C.)), 10 parts by weight of EOR(l)(octene content: 24%, melt index: 1 dg/min), 1 parts by weight of dimethylol phenolic resin, 1 parts by weight of crosslinking accelerator A(oxides of Mg), 7 parts by weight of organic additives and proper quantity of other additives such as antioxidant, antistatic agent and thermostabilizer were mixed in a plasticorder (mixer for intensive mixing), and dynamic vulcanization process was performed under a condition of 200° C. and 100 rpm, during the retention time of 5 minutes. Then, the mixture was dried in an oven of 120° C. for about 2 hours. Test specimens were prepared from injection molding.

In order to evaluate the properties of the resulting crosslinked TPE, mechanical properties(stress-strain) was measured according to the method of ASTM D-412 and D-624, surface hardness was according to the method of (Note)
(a) EPDM(1): ethylene-propylene-diene rubber
  propylene content: 43%; Mooney viscosity: 65 $ML_{1+4}$ (100° C.)
(b) EOR(1): ethylene-octene copolymer
  octene content: 24%; melt index: 1 dg/min
(c) Polypropylene: manufactured by Honam Petrochemical Corp.
  melt index: 10 dg/min; isotactic index: 98%
(d) Crosslinking agent: Dimethylol phenolic resin
(e) Crosslinking accelerator A: Oxides of Mg
(f) Crosslinking accelerator B: Oxides of Pb
(g) Crosslinking accelerator C: Oxides of Zn

EXAMPLES 13~24

By following the procedure of Example 1, crosslinked thermoplastic elastomers were prepared, except that the amounts of polypropylene, EPDM, EOR and the crosslinking agent, and kind and amount of crosslinking accelerator are selected as shown in Table 2. The properties of the products were measured by the same criteria and methods in Example 1, and the results are shown in Table 2.

together with crosslinking accelerator of metal oxides, and in these cases the products have prefer properties to the product prepared by using only phenolic resin. Further, among the crosslinking agent systems, system consisting of phenolic resin, oxides of Mg and oxides of Zn is the most effective.

TABLE 2

| Components | | | Examples | | | | | | | | | | | |
|---|---|---|---|---|---|---|---|---|---|---|---|---|---|---|
| | | | 13 | 14 | 15 | 16 | 17 | 18 | 19 | 20 | 21 | 22 | 23 | 24 |
| EPDM(1) | | | 60 | 60 | 60 | 60 | 60 | 60 | 60 | 60 | 60 | 60 | 60 | 60 |
| EOR(1) | | | 12 | 12 | 12 | 12 | 12 | 12 | 12 | 12 | 12 | 12 | 12 | 12 |
| Polypropylene | | | 28 | 28 | 28 | 28 | 28 | 28 | 28 | 28 | 28 | 28 | 28 | 28 |
| Crosslinking agent | | | 5 | 5 | 5 | 5 | 7 | 7 | 7 | 7 | 9 | 9 | 12 | 15 |
| Crosslinking accelerator A | | | — | 3 | — | — | — | 4 | 4 | 5 | 7 | 7 | 5 | — |
| Crosslinking accelerator B | | | — | — | 3 | — | — | 1 | — | — | 3 | — | 5 | 5 |
| Crosslinking accelerator C | | | — | — | — | 3 | — | — | 1 | — | — | 3 | — | 5 |
| Properties | ASTM | Units | Temp. | | | | | | | | | | | |
| Hardness | D2240 | shore | 25° C. | 62A | 64A | 64A | 64A | 64A | 66A | 68A | 66A | 68A | 68A | 68A | 70A |
| Tensile strength | D412 | kgf/cm$^2$ | 25° C. | 42 | 48 | 48 | 49 | 49 | 57 | 58 | 55 | 62 | 65 | 66 | 68 |
| 100% Modulus | D412 | kgf/cm$^2$ | 25° C. | 30 | 38 | 35 | 37 | 35 | 41 | 44 | 39 | 44 | 46 | 46 | 47 |
| Elongation | D412 | % | 25° C. | 500 | 450 | 450 | 450 | 410 | 380 | 360 | 400 | 340 | 300 | 280 | 220 |
| Permanent tension set | D412 | % | 25° C. | 18 | 15 | 16 | 15 | 15 | 14 | 13 | 14 | 12 | 11 | 10 | 10 |
| Permanent compression set | D395 | % | 70° C. | 39 | 34 | 35 | 33 | 34 | 30 | 29 | 32 | 30 | 28 | 28 | 27 |
| Crosslinking degree | Xylene | wt % | Boil | 34 | 43 | 40 | 44 | 50 | 57 | 59 | 55 | 72 | 74 | 74 | 75 |

(Note)
(a) EPDM(1): ethylene-propylene-diene rubber
  propylene content: 43%; Mooney viscosity: 65 ML$_{1+4}$ (100° C.)
(b) EOR(1): ethylene-octene copolymer
  octene content: 24%; melt index: 1 dg/min
(c) Polypropylene: manufactured by Honam Petrochemical Corp.
  melt index 10 dg/min; isotactic index: 98%
(d) Crosslinking agent: Dimethylol phenolic resin
(e) Crosslinking accelerator A: Oxides of Mg
(f) Crosslinking accelerator B: Oxides of Pb
(g) Crosslinking accelerator C: Oxides of Zn As shown in Tables 1 and 2, the present invention can provide crosslinked thermoplastic elastomers having various hardnesses and therein good properties. Also, the degree of crosslinking can be increased by using phenolic resin

EXAMPLES 25~32 AND COMPARATIVE EXAMPLES 1~2

By following the procedure of Example 1, crosslinked thermoplastic elastomers were prepared, except that the amounts of polypropylene and the crosslinking agent, and kinds and amounts of EPDM, EOR and crosslinking accelerator are selected as shown in Table 3. The properties of the products were measured by the same criteria and methods in Example 1, and the results are shown in Table 3.

TABLE 3

| Components | | | Comp. Example 1 | Example | | | | | | | | Comp. Example 2 |
|---|---|---|---|---|---|---|---|---|---|---|---|---|
| | | | | 25 | 26 | 27 | 28 | 29 | 30 | 31 | 32 | |
| EPDM(2) | | | 76 | 56 | 56 | 56 | 66 | 46 | 36 | 26 | 16 | — |
| EOR(2) | | | — | 20 | — | — | — | — | — | — | — | — |
| EOR(3) | | | — | — | 20 | — | 10 | 30 | 40 | 50 | 60 | 76 |
| EOR(4) | | | — | — | — | 20 | — | — | — | — | — | — |
| Polypropylene | | | 24 | 24 | 24 | 24 | 24 | 24 | 24 | 24 | 24 | 24 |
| Crosslinking agent | | | 12 | 12 | 12 | 12 | 12 | 12 | 12 | 12 | 12 | 12 |
| Crosslinking accelerator A | | | 4 | 4 | 4 | 4 | 4 | 4 | 4 | 4 | 4 | 4 |
| Crosslinking accelerator B | | | 2 | 2 | 2 | 2 | 2 | 2 | 2 | 2 | 2 | 2 |
| Properties | ASTM | Units | Temp. | | | | | | | | | |
| Hardness | D2240 | shore | 25° C. | 63A | 66A | 66A | 66A | 64A | 70A | 85A | 40D | 50D | 60D |
| Tensile | D412 | kgf/cm$^2$ | 25° C. | 55 | 58 | 65 | 70 | 60 | 71 | 62 | 48 | 55 | 65 |

TABLE 3-continued

| | | | | | | | | | | | | | |
|---|---|---|---|---|---|---|---|---|---|---|---|---|---|
| strength | | | | | | | | | | | | | |
| 100% Modulus | D12 | kgf/cm² | 25° C. | 41 | 47 | 56 | 59 | 52 | 59 | 47 | 25 | 30 | 31 |
| Permanent tension set | D412 | % | 25° C. | 12 | 10 | 9 | 9 | 11 | 8 | 12 | 25 | — | — |
| Permanent compression set | D395 | % | 70° C. | 28 | 25 | 23 | 23 | 25 | 23 | 27 | 35 | — | — |
| Crosslinking degree | Xylene | wt % | Boil | 83 | 68 | 71 | 70 | 75 | 61 | 49 | 44 | 30 | 12 |

(Note)
(a) EPDM(2): ethylene-propylene-diene rubber
propylene content: 35%; Mooney viscosity 69 $ML_{1+4}$ (100° C.)
(b) EOR(2): ethylene-octene copolymer
octene content: 30%; melt index: 0.3 dg/min
(c) EOR(3): ethylene-octene copolymer
octene content: 20%; melt index: 18 dg/min
(d) EOR(4): ethylene-octene copolymer
octene content: 9.5%; melt index: 30 dg/min
(e) Polypropylene: manufactured by Honam Petrochemical Corp.
melt index: 10 dg/min; isotactic index: 98%
(f) Crosslinking agent: Dimethylol phenolic resin
(g) Crosslinking accelerator A: Oxides of Mg (h) Crosslinking accelerator B: Oxides of Pb
The results of Table 3 show that apart from EPDM, some amount of EOR may also be crosslinked by using the crosslinking agent system according to the present. That is to say, the crosslinking system with metal oxides may induce the crosslinking reaction of EOR, and thereby the degree of crosslinking can be increased. This shows that, within the same amount of rubber, the crosslinked thermoplastic elastomers prepared by using EOR together with EPDM have better properties than those prepared by using only EPDM. But, the crosslinked thermoplastic elastomer prepared by using only EOR(the product of Comp. Example 2) has poor properties due to the low degree of crosslinking.

EXAMPLES 33~43

Examples 33~43 are provided for illustrating the properties of the crosslinked thermoplastic elastomers prepared by varying the kind of EPDM.

By following the procedure of Example 1, crosslinked thermoplastic elastomers were prepared, except that the amounts of polypropylene, EOR, the crosslinking agent and the crosslinking accelerator, and kind and amount of EPDM are selected as shown in Table 4. The properties of the products were measured by the same criteria and methods in Example 1 and the results are shown in Table 4.

TABLE 4

| | | | | Examples | | | | | | | | | |
|---|---|---|---|---|---|---|---|---|---|---|---|---|---|
| Components | | | | 33 | 34 | 35 | 36 | 37 | 38 | 39 | 40 | 41 | 42 | 43 |
| EPDM(3) | | | | 65.6 | 60 | — | — | — | 51.3 | 42.7 | 34 | 26.1 | 17.4 | 14.2 |
| EPDM(4) | | | | — | — | 60 | — | — | — | — | — | — | — | — |
| EPDM(5) | | | | — | — | — | 60 | — | — | — | — | — | — | — |
| EPDM(6) | | | | — | — | — | — | 60 | — | — | — | — | — | — |
| EOR(1) | | | | 17.4 | 16 | 16 | 16 | 16 | 13.7 | 11.3 | 9 | 6.9 | 4.6 | 3.8 |
| Polypropylene | | | | 17 | 24 | 24 | 24 | 24 | 35 | 46 | 57 | 68 | 78 | 82 |
| Crosslinking agent | | | | 7.6 | 7 | 7 | 7 | 7 | 6 | 5 | 4 | 3 | 2 | 1.7 |
| Crosslinking accelerator A | | | | 5.5 | 5 | 5 | 5 | 5 | 4.3 | 3.6 | 2.8 | 2.2 | 1.5 | 1.2 |
| Properties | ASTM | Units | Temp. | | | | | | | | | | | |
| Hardness | D2240 | shore | 25° C. | 56A | 64A | 62A | 62A | 60A | 70A | 78A | 86A | 43D | 50D | 55D |
| Tensile strength | D412 | kgf/cm² | 25° C. | 46 | 55 | 53 | 53 | 50 | 70 | 78 | 110 | 180 | 230 | 260 |
| 100% Modulus | D412 | kgf/cm² | 25° C. | 37 | 42 | 40 | 40 | 36 | 47 | 53 | 85 | 120 | 160 | 180 |
| Elongation | D412 | % | 25° C. | 220 | 270 | 300 | 300 | 320 | 320 | 330 | 420 | 530 | 580 | 600 |
| Permanent tension set | D412 | % | 25° c. | 8 | 12 | 13 | 13 | 14 | 13 | 16 | 23 | 42 | 48 | — |
| Permanent compression set | D395 | % | 70° C. | 25 | 29 | 30 | 30 | 32 | 30 | 32 | 38 | 45 | — | — |
| Crosslinking degree | Xylene | wt % | Boil | 79 | 73 | 69 | 68 | 65 | 64 | 55 | 46 | 39 | 30 | 27 |

(Note)
(a) EPDM(3): ethylene-propylene-diene rubber
propylene content: 15%; Mooney viscosity: 72 $ML_{1+4}$ (100° C.)
(b) EPDM(4): ethylene-propylene-diene rubber
propylene content: 25%; Mooney viscosity: 50 $ML_{1+4}$ (100° C.)
(c) EPDM(5): ethylene-propylene-diene rubber
propylene content: 37%; Mooney viscosity: 20 $ML_{1+4}$ (100° C.)

(d) EPDM(6): ethylene-propylene-diene rubber
  propylene content: 46%; Mooney viscosity: 100 $ML_{1+4}$ (100° C.)
(e) EOR(1): ethylene-octene copolymer
  octene content: 24%; melt index: 1 dg/min
(f) Polypropylene: manufactured by Honam Petrochemical Corp.
  melt index: 10 dg/min; isotactic index: 98%
(g) Crosslinking agent: Dimethylol phenolic resin
(e) Crosslinking accelerator A: Oxides of Mg

EXAMPLES 44~46 AND COMPARATIVE EXAMPLES 3~11

By following the procedure of Example 1, crosslinked thermoplastic 10 elastomers were prepared, except that the amounts of polypropylene and the crosslinking agent, and kinds and amounts of EPDM, EOR and crosslinking accelerator are selected as shown in Table 5. The properties of the products were measured by the same criteria and methods in Example 1, and the results are shown in Table 5.

TABLE 5

| | | | | C. Ex. | Ex. | C. Ex. | | | Ex. | C. Ex. | | | Ex. | C. Ex. | |
|---|---|---|---|---|---|---|---|---|---|---|---|---|---|---|---|
| Components | | | | 3 | 44 | 4 | 5 | 6 | 45 | 7 | 8 | 9 | 46 | 10 | 11 |
| EPDM(4) | | | | 76 | 56 | 56 | 56 | 59 | 39 | 39 | 39 | 42 | 30 | 30 | 30 |
| EOR(5) | | | | — | 20 | — | 10 | — | 20 | — | 10 | — | 12 | — | 6 |
| Styrene-butadien rubber | | | | — | — | 20 | 10 | — | — | 20 | 10 | — | — | 12 | 6 |
| Polypropylene | | | | 24 | 24 | 24 | 24 | 41 | 41 | 41 | 41 | 58 | 58 | 58 | 58 |
| Crosslinking agent | | | | 9 | 9 | 9 | 9 | 7 | 7 | 7 | 7 | 5 | 5 | 5 | 5 |
| Crosslinking accelerator A | | | | 3 | 3 | 3 | 3 | 4 | 4 | 4 | 4 | 4 | 4 | 4 | 4 |
| Crosslinking accelerator B | | | | 2 | 2 | 2 | 2 | 2 | 2 | 2 | 2 | 1 | 1 | 1 | 1 |
| Properties | ASTM | Units | Temp. | | | | | | | | | | | | |
| Hardness | D2240 | shore | 25° C. | 65A | 66A | 64A | 65A | 73A | 75A | 72A | 73A | 82A | 84A | 81A | 82A |
| Tensile strength | D412 | $kgf/cm^2$ | 25° C. | 53 | 56 | 48 | 48 | 74 | 79 | 68 | 70 | 87 | 91 | 83 | 85 |
| 100% Modulus | D412 | $kgf/cm^2$ | 25° C. | 40 | 44 | 35 | 36 | 50 | 55 | 46 | 50 | 58 | 62 | 50 | 54 |
| Permanent tension set | D412 | % | 25° C. | 13 | 11 | 14 | 14 | 15 | 14 | 17 | 16 | 17 | 15 | 18 | 18 |
| Permanent compression set | D395 | % | 70° C. | 29 | 27 | 31 | 32 | 32 | 30 | 34 | 33 | 34 | 32 | 36 | 35 |
| Crosslinking degree | Xylene | wt % | Boil | 83 | 72 | 62 | 66 | 65 | 55 | 46 | 50 | 49 | 44 | 36 | 41 |

(Note)
(a) EPDM(4): ethylene-propylene-diene rubber
  propylene content: 25%; Mooney viscosity: 50 $ML_{1+4}$ (100° C.)
(b) EOR(5): ethylene-octene copolymer
  octene content: 19%; melt index: 30 dg/min
(c) Styrene-butadiene rubber: styrene content: 23%
(d) Polypropylene: manufactured by Honam Petrochemical Corp.
  melt index: 10 dg/min; isotactic index: 98%
(e) Crosslinking agent: Dimethylol phenolic resin
(f) Crosslinking accelerator A: Oxides of Mg
(g) Crosslinking accelerator B: Oxides of Pb As shown in Table 5, the crosslinked thermoplastic elastomers prepared by using styrene-butadien rubber(SBR) together with EPDM have inferior properties to the products prepared by using only EPDM or using EOR and EPDM. This indicates that SBR is not crosslinked by the crosslinking agent system according to the present, and that the interfacial adhesions between SBR and EPDM or polypropylene are weak.

As above described, according to the present invention, ethylene-octene copolymer incorporated in the crosslinking system comprising olefin-based thermoplastic resin and olefin-based rubber may be partially crosslinked by the crosslinking agent system consisting of phenolic resin and metal oxides and exist in the form of fine and uniform dispersion. Further, the interfacial adhesion between the ethylene-octene copolymer and the crosslinked ethylene-propylene-dien rubber can increase the degree of crosslinking. Consequently, the crosslinked thermoplastic elastomers provided by the present invention have good properties such as the tensile strength, tension set, compression set and the like.

Although preferred embodiments of the present invention have been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. An olefin-based crosslinked thermoplastic elastomer comprising, based on 100 parts by weight of following (A)+(B)+(C), (A) 17–82 parts by weight of a thermoplastic polyolefin resin;
  (B) 14.2–76 parts by weight of an ethylene-propylene-diene rubber which satisfies the following conditions;
    (a) propylene content: 10–50 wt %
    (b) Mooney viscosity at 100° C.: 20–100 $ML_{1+4}$
  (C) 3.8–76 parts by weight of an ethylene-octene copolymer which satisfies the following conditions;
    (a) octene content: 9.5–30 wt %
    (b) melt index: 0.3–30 dg/min.; and
  (D) 1–15 parts by weight of a phenolic crosslinking agent.

2. The olefin-based crosslinked thermoplastic elastomer according to claim 1, which comprises, based on 100 parts by weight of following (A)+(B)+(C), (A) 20–70 parts by weight of a thermoplastic polyolefin resin;
  (B) 30–60 parts by weight of an ethylene-propylene-diene rubber which satisfies the following conditions;
    (a) propylene content: 10–50 wt %

(b) Mooney viscosity at 100° C.: 20–100 $ML_{1+4}$ (C) 20–50 parts by weight of an ethylene-octene copolymer which satisfies the following conditions;
(a) octene content: 9.5–30 wt %
(b) melt index: 0.3–30 dg/min.; and (D) 3–15 parts by weight of a phenolic crosslinking agent.

3. The olefin-based crosslinked thermoplastic elastomer according to claim 1 or 2, wherein said ethylene-octene copolymer is obtained by copolymerizing ethylene units with octene in the presence of metallocene catalyst.

4. The olefin-based crosslinked thermoplastic elastomer according to claim 1 or 2, wherein said polyolefin thermoplastic resin(A) is homopropylene or, lock or random copolymers of ethylene and propylene.

5. The olefin-based crosslinked thermoplastic elastomer according to claim 1 or 2, wherein said the phenolic crosslinking agent is dimethylol phenolic resins.

6. The olefin-based crosslinked thermoplastic elastomer according to claim 1 or 2, which further comprises one or more crosslinking accelerators selected from a group consisting of oxides of Mg, Pb and Zn in an amount of 1–7 parts by weight based on 100 parts by weight of (A)+(B)+(C).

7. A method for preparing an olefin-based crosslinked thermoplastic elastomer, which comprises step of dynamical vulcanization following components (A)–(D) at a temperature of 170–220° C., 30–120 rpm during retention time of 5–20 minutes, (A) 17–82 parts by weight of a thermoplastic polyolefin resin;

(B) 14.2–76 parts by weight of an ethylene-propylene-diene rubber which satisfies the following conditions;
(a) propylene content: 10–50 wt %
(b) Mooney viscosity at 100° C.: 20–100 $ML_{1+4}$ (C) 3.8–76 parts by weight of an ethylene-octene copolymer which satisfies the following conditions;
(a) octene content: 9.5–30 wt %
(b) melt index: 0.3–30 dg/min.; and (D) 1–15 parts by weight of a phenolic crosslinking agent, wherein said parts by weight being based on 100 parts by weight of (A)+(B)+(C).

8. The method according to claim 7, wherein said ethylene-octene copolymer is obtained by copolymerizing ethylene units with octene in the presence of metallocene catalyst.

9. The method according to claim 7, wherein one or more crosslinking accelerators selected from a group consisting of oxides of Mg, Pb and Zn in an amount of 1–7 parts by weight based on 100 parts by weight of (A)+(B)+(C) are incorporated.

* * * * *